US010922456B1

(12) United States Patent
Chowdhury et al.

(10) Patent No.: US 10,922,456 B1
(45) Date of Patent: Feb. 16, 2021

(54) CIRCUIT MODIFICATION FOR EFFICIENT ELECTRO-STATIC DISCHARGE ANALYSIS OF INTEGRATED CIRCUITS

(71) Applicant: Cadence Design Systems, Inc., San Jose, CA (US)

(72) Inventors: Nandu Kumar Chowdhury, Greater Noida (IN); Rishab Dhawan, Delhi (IN); Parveen Khurana, Delhi (IN)

(73) Assignee: Cadence Design Systems Inc., San Jose, CA (US)

( * ) Notice: Subject to any disclaimer, the term of this patent is extended or adjusted under 35 U.S.C. 154(b) by 0 days.

(21) Appl. No.: 16/864,080

(22) Filed: Apr. 30, 2020

(51) Int. Cl.
*G06F 30/30* (2020.01)
*G06F 30/31* (2020.01)
*G06F 30/3308* (2020.01)
*G06F 117/02* (2020.01)

(52) U.S. Cl.
CPC .......... *G06F 30/31* (2020.01); *G06F 30/3308* (2020.01); *G06F 2117/02* (2020.01)

(58) Field of Classification Search
CPC ... G06F 30/31; G06F 30/3308; G06F 2117/02
USPC ......................................................... 716/102
See application file for complete search history.

(56) References Cited

U.S. PATENT DOCUMENTS

| | | | | |
|---|---|---|---|---|
| 7,617,467 B2 * | 11/2009 | Bell | ...................... | G06F 30/367 |
| | | | | 716/106 |
| 8,079,002 B1 * | 12/2011 | Lo | ........................... | G06F 30/34 |
| | | | | 716/106 |
| 9,619,604 B1 | 4/2017 | Rai et al. | | |
| 9,996,655 B2 * | 6/2018 | Sharma | ................. | G06F 30/398 |

* cited by examiner

*Primary Examiner* — Jack Chiang
*Assistant Examiner* — Brandon Bowers
(74) *Attorney, Agent, or Firm* — Foley & Lardner LLP (57) ABSTRACT

The present embodiments relate to electrostatic discharge (ESD) simulation of integrated circuit designs. A netlist of the circuit design can be modified to include ESD protection devices and only essential non-ESD devices. The essential non-ESD devices can be determined based on whether a non-ESD device satisfies one or more of two conditions: (i) a least resistance path (LRP) value of at least one terminal of the non-ESD device from any port of the set of ports is less than a first threshold value or (ii) an effective resistance value between at least one terminal of the non-ESD device from any port of the set of ports is less than a second threshold value. The essential non-ESD devices are included in a reduced netlist in addition to the ESD protection devices. The ESD simulation is carried out on the reduced netlist, thereby reducing simulation time.

20 Claims, 6 Drawing Sheets

Port#1

| Device Name | LRP value (ohms) | |
|---|---|---|
| esd_dev#1 | 4.3 | |
| esd_dev#4 | 5.0 | |
| esd_dev#3 | 5.2 | |
| non_esd_dev#1 | 8.1 | |
| esd_dev#2 | 15.4 | |
| non_esd_dev#2 | 18.2 | } < 26.5 |
| non_esd_dev#3 | 19.4 | |
| non_esd_dev#4 | 44.3 | } > 26.5 |
| non_esd_dev#5 | 52.2 | |

300

First distance parameter = n x (LRP[esd_dev#last] - LRP[esd_dev#first])

First distance parameter = 1 x (LRP[esd_dev#2] - LRP[esd_dev#1])

First distance parameter = 1 x (15.4 – 4.3)

First distance parameter = 11.1

First threshold value = First distance parameter + LRP[esd_dev#last]

First threshold value = 11.1 + 15.4 = 26.5

Figure 3

Second distance parameter = n x (Reff[esd_dev#last] - Reff[esd_dev#first])
Second distance parameter = 1 x (Reff[esd_dev#4] - Reff[esd_dev#1])
Second distance parameter = 1 x (10.2 – 0.2)
Second distance parameter = 10

Second threshold value = Second distance parameter + Reff[esd_dev#last]
Second threshold value = 10 + 10.2 = 20.2

CIRCUIT MODIFICATION FOR EFFICIENT ELECTRO-STATIC DISCHARGE ANALYSIS OF INTEGRATED CIRCUITS

TECHNICAL FIELD

The present disclosure relates generally to integrated circuits, including but not limited to methods and apparatuses for electro-static discharge (ESD) analysis of integrated circuits.

BACKGROUND

Electronic design automation (EDA) tools are used to design integrated circuits. Integrated circuits can include many thousands and perhaps millions of circuit elements (e.g., transistors, logic gates, diodes) and interconnecting wires and busses. Prior to fabrication of the integrated circuit design, the design can be analyzed to ensure that it meets design constraints. The design constraints can include, for example, ESD constraints. The EDA tools can analyze the designed integrated circuit for response to ESD at one or more ports of the circuit. For example, ESD tools can simulate the designed integrated circuit's response to ESD at one or more of its ports. Designers can, based on the ESD analysis, make changes to the design such that that the designed integrated circuit meets the specified design constraints.

SUMMARY

According to some aspects, embodiments relate to a method. The method includes receiving, by at least one processor, a netlist of a circuit. The method further includes determining, by the at least one processor, a set of ports of the circuit, the set of ports including at least one of a voltage source port, a voltage sink port, or an input-output port. The method also includes determining, by the at least one processor, ESD devices in the circuit. The method additionally includes determining, by the at least one processor, non-ESD devices in the circuit. The method further includes selecting, by the at least one processor, a set of non-ESD devices from the non-ESD devices in the circuit, wherein for each non-ESD device in the set of non-ESD devices at least one of (i) a least resistance path (LRP) value of at least one terminal of the non-ESD device from any port of the set of ports is less than a first threshold value or (ii) an effective resistance value between at least one terminal of the non-ESD device from any port of the set of ports is less than a second threshold value is true. The method also includes generating, by the at least one processor, a reduced netlist of the circuit from the netlist of the circuit, the reduced netlist including the set of ESD devices and the set of non-ESD devices. The method additionally includes simulating, by the at least one processor, the reduced netlist for ESD analysis.

According to some aspect, embodiments relate to a computer readable storage medium having instructions stored thereon which when executed by a computer, cause the computer to execute a method. The method includes receiving, by at least one processor, a netlist of a circuit. The method further includes determining, by the at least one processor, a set of ports of the circuit, the set of ports including at least one of a voltage source port, a voltage sink port, or an input-output port. The method also includes determining, by the at least one processor, ESD devices in the circuit. The method additionally includes determining, by the at least one processor, non-ESD devices in the circuit. The method further includes selecting, by the at least one processor, a set of non-ESD devices from the non-ESD devices in the circuit, wherein for each non-ESD device in the set of non-ESD devices at least one of (i) a least resistance path (LRP) value of at least one terminal of the non-ESD device from any port of the set of ports is less than a first threshold value or (ii) an effective resistance value between at least one terminal of the non-ESD device from any port of the set of ports is less than a second threshold value is true. The method also includes generating, by the at least one processor, a reduced netlist of the circuit from the netlist of the circuit, the reduced netlist including the set of ESD devices and the set of non-ESD devices. The method additionally includes simulating, by the at least one processor, the reduced netlist for ESD analysis.

According to some aspects, embodiments relate to a system comprising one or more processors, the one or more processors configured to: receive a netlist of a circuit. The one or more processors are further configured to determine a set of ports of the circuit, the set of ports including at least one of a voltage source port, a voltage sink port, or an input-output port. The one or more processors are also configured to determine ESD devices in the circuit, and determine non-ESD devices in the circuit. The one or more processors are also configured to select a set of non-ESD devices from the non-ESD devices in the circuit, wherein for each non-ESD device in the set of non-ESD devices at least one of (i) a least resistance path (LRP) value of at least one terminal of the non-ESD device from any port of the set of ports is less than a first threshold value or (ii) an effective resistance value between at least one terminal of the non-ESD device from any port of the set of ports is less than a second threshold value is true. The one or more processors are also configured to generate a reduced netlist of the circuit from the netlist of the circuit, the reduced netlist including the set of ESD devices and the set of non-ESD devices, and simulate the reduced netlist for ESD analysis.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

As discussed herein, ESD analysis of an integrated circuit design can be carried out to ascertain that the design meets ESD constraints. ESD can cause failure in integrated circuits. ESD at one or more ports of the circuit can result in high current flow into the one or more ports. Circuit components connected to the ports are therefore exposed to the high current flow. ESD analysis can simulate ESD conditions and ascertain the performance of the circuit components under exposure to high current resulting from ESD. Some circuit designs can include ESD protection circuits, such as clamping circuits, that provide a discharge path for the high currents resulting from ESD, and thereby provide protection to other circuitry. Simulation of the circuit design for response to ESD conditions can include simulating the entire circuit design. Such simulations can include not only the ESD protection circuits but also other functional blocks that may or may not be affected under ESD conditions. As such simulations take into account the entire circuit design, the simulation time can be undesirably long.

As discussed herein, the circuit design can be modified before ESD simulation such that only the circuitry that is likely to suffer breakdown conditions under ESD conditions is selected for ESD simulations. The netlist of the circuit design can be reduced from including the entire circuit design to instead including circuitry relevant to and affected by ESD conditions. As a result, the size of the circuit design provided to an ESD simulation tool is relatively smaller than the size of the original circuit design. Simulating the reduced circuit design can reduce the amount of time it would take for completing the simulation while at the same time including the relevant circuitry for ESD simulation.

Figure 1:
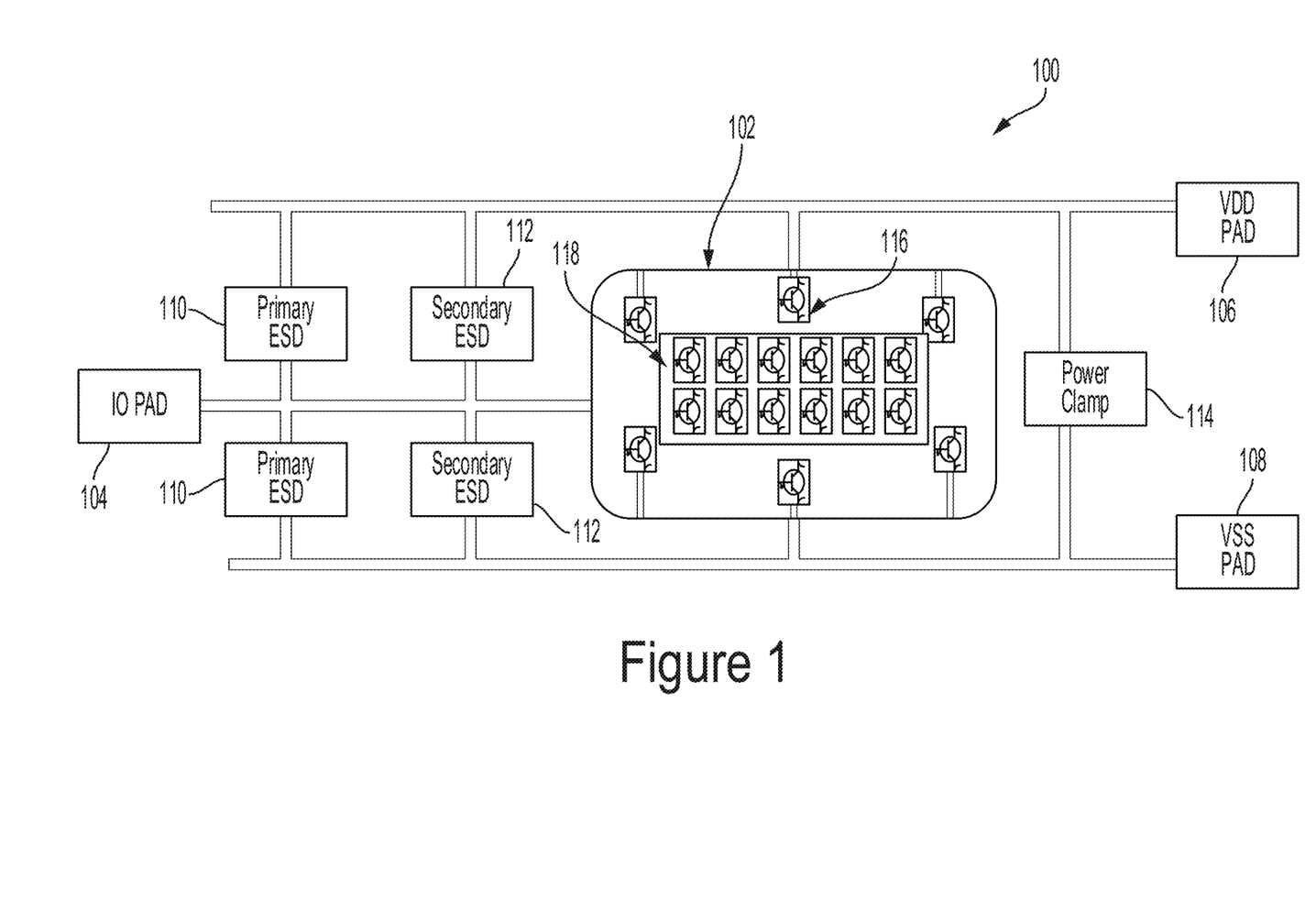
FIG. 1 shows a block diagram of an example circuit design, according to present embodiments.

FIG. 1 shows a block diagram of an example circuit design 100. The example circuit design 100 includes an internal circuitry 102 that includes the functional blocks of the circuit design 100. The circuit design 100 also includes several pads that during fabrication could be connected to pins of an integrated circuit package via bonding wires. For example, the circuit design includes an I/O pad 104, a VDD pad 106, and a VSS pad 108. It is understood that the circuit design can include more or fewer pads than the ones shown in the example circuit design 100. The I/O pad 104 can provide an interface between the internal circuitry 102 and the circuitry to be connected outside the integrated circuit. As an example, the I/O pad 104 can include a driver circuit that can receive a signal from the internal circuitry and produce a drive signal to drive circuitry outside of the integrated circuit. The VDD pad 106 can be connected to the supply voltage for the circuit design, and the VSS pad 108 can be connected to the ground or sink voltage of the circuit design.

The circuit design 100 also can include one or more ESD protection circuitry. For example, the circuit design 100 can include primary ESD circuitry 110, secondary ESD circuitry 112, and power clamp circuitry 114. The primary ESD circuitry 110 and the secondary ESD circuitry 112 can provide protection to the internal circuitry 102 against ESD conditions on the I/O pad 104. The primary ESD circuitry 110 and/or the secondary ESD circuitry 112 can include ESD protection circuitry such as, for example, reverse biased diodes connected between an input node of the device to be protected and the supply and ground voltage terminals of the device. Under normal operating conditions, the reverse biased diodes appear as open circuits between the input node and the supply and ground terminals. However, if a high voltage pulse appears at the input node due to an ESD, the reverse biased diodes will become forward biased (assuming the high voltage is greater than the supply or ground voltage by the threshold value of the diodes), and provide a path for the resulting high currents to flow, and thereby limiting the rise in voltage at the input node of the device to be protected. The primary ESD circuitry 110 and/or the secondary ESD circuitry 112 may also include other types of protection circuitry such as silicon controlled rectifiers (SCRs) to provide high voltage and current protection to the devices. The primary ESD circuitry 110 and the secondary ESD circuitry 112 may include similar protection circuitry. The secondary ESD circuitry 112 can be included to provide a second line of protection in case the primary ESD circuitry 110 fails or is damaged by the ESD.

The power clamp circuitry 114 can provide protection to the internal circuitry (and any other circuitry on in the circuit design 100) against ESD conditions on the VDD pad 106 or the VSS pad 108. The internal circuitry 102 also can include interface circuitry 116 that couples the other functional blocks 118 of the internal circuitry 102 to various pads, such as the I/O pad 104, the VDD pad 106 and the VSS pad 108. The interface circuitry 116, with its proximity to the various pads, may be relatively more vulnerable to damage due to ESD than other circuitry in the internal circuitry 102.

Figure 2:
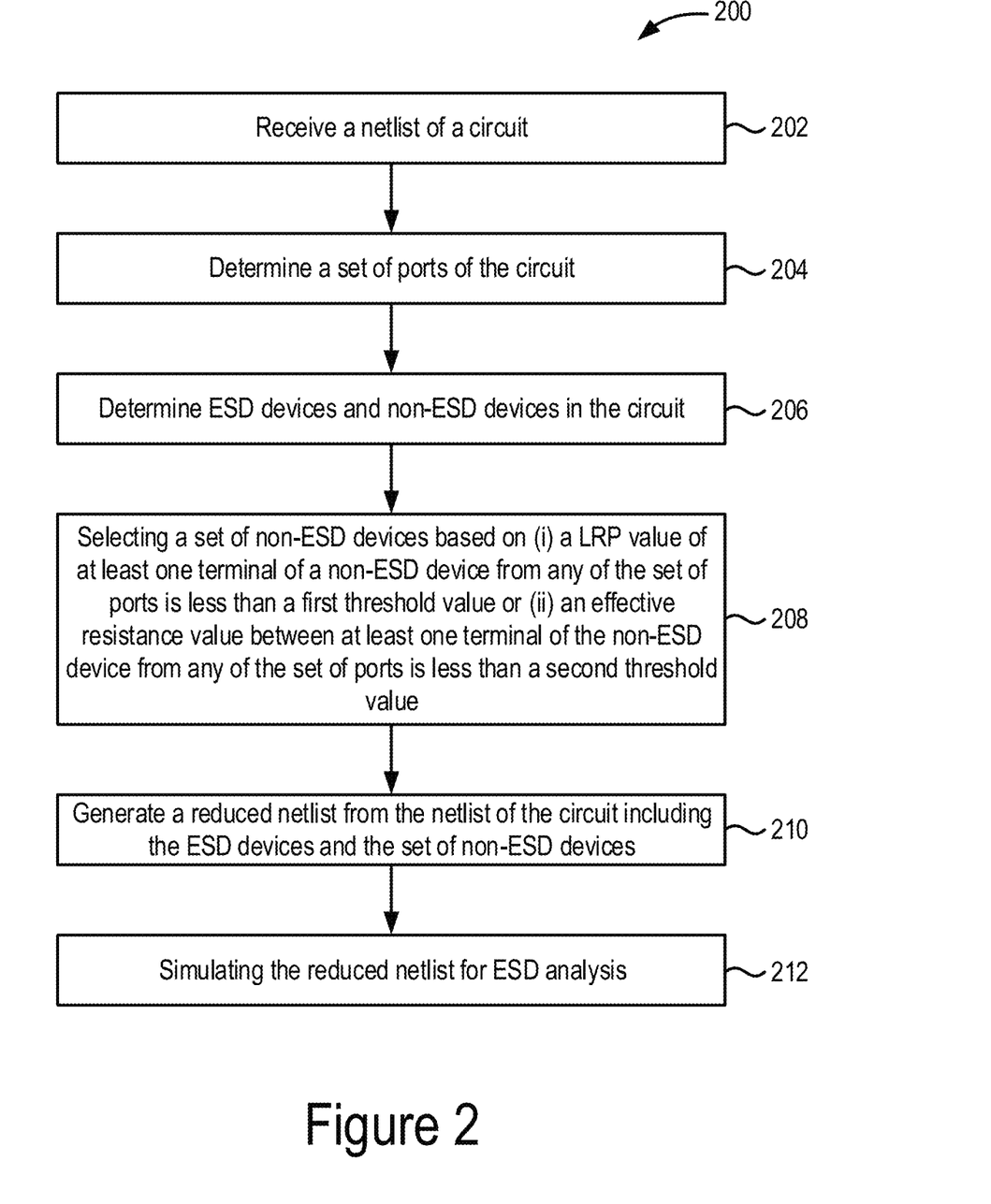
FIG. 2 shows a flow diagram of an example process executed by the EDA tool for simulating the circuit design for ESD analysis, according to the present embodiments.

As mentioned above, a designer can utilize EDA tools to simulate the circuit design, such as the circuit design 100 shown in FIG. 1, for ESD analysis. However unlike traditional EDA tools, which simulate the entire netlist of the circuit design 100 for ESD analysis, the EDA tool discussed herein selects only a subset of the netlist of the circuit design 100 for simulation. FIG. 2 shows a flow diagram of an example process 200 executed by the EDA tool for simulating the circuit design 100 for ESD analysis. In particular, the EDA tool can execute the process 200, which selects only a subset of the circuitry of the circuit design 100 that is relevant to or can be affected by ESD conditions at one or more ports of the circuit design. The process includes receiving a netlist of the circuit (202). The EDA tool can receive the netlist of the circuit design, such as the circuit design 100 shown in FIG. 1. The netlist can include a description of the connectivity of various devices within the circuit design 100. For example, the netlist can include a list of all the devices in the circuit design 100 and a list of nodes to which they are connected. In some examples, the netlist can include transistor level devices (such as, for example, transistors, diodes, resistors, capacitors, etc.). The EDA tool can also receive parasitic data associated with various nets within the netlist. For example, the EDA tool can receive a Detailed Standard Parasitic Format (DSPF) file that includes the parasitic information (such as, for example, resistance, capacitance, or inductance) associated with each node or net of the netlist of the circuit design 100. In some examples, the EDA tool can utilize data from device libraries to itself generate a DSPF file associated with the netlist of the circuit design 100. The EDA tool can receive parasitic information in formats other than DSPF, such as, for example, standard parasitic format (SPF), reduced standard parasitic format (RSPF), standard parasitic exchange format (SPEF), Synopsys binary parasitic format (SBPF), etc.

Based on the netlist of the circuit design 100, the EDA tool can determine a set of ports of the circuit (204). The EDA tool can parse the netlist to identify ports of the circuit design 100. The ports can include pads, such as I/O pads, VDD pads, or VSS pads (as shown in FIG. 1). The ports can provide connectivity to circuitry outside of the integrated circuit package within which the circuit design is to be fabricated. The ports, because of their connectivity to external circuitry, are vulnerable to ESD conditions. For example, an external I/O pin of an integrated circuit package can be connected to the I/O pad 104 (FIG. 1). This I/O pin could be exposed to an electrostatic discharge that can cause high current to flow into the integrated circuit. Thus, the EDA tool can identify that the I/O pad 104 is a port. Similarly, the EDA tool can determine that the VDD pad 106 and the VSS pad 108 are also ports.

The EDA tool can determine ESD devices and non-ESD devices in the netlist (206). ESD devices can include ESD protection devices that are included in the circuit design 100 for ESD protection. In some instances, the netlist can include an identity of circuits that are ESD protection circuits. For example, the primary ESD circuitry 110 can be identified as esd_dev #1 in the netlist, and the secondary ESD circuitry 112 can be identified as esd_dev #2 in the netlist. The EDA tool can search the netlist for names of devices that include "esd" to identify ESD devices. The EDA tool can identify all other devices in the netlist, which are not ESD devices, as non-ESD devices. For example, referring to FIG. 1, the EDA tool can identify the primary ESD circuitry 110, the secondary ESD circuitry 112, and the power clamp circuitry 114 as ESD devices, and identify all the devices in the internal circuitry 102 as non-ESD devices. It should be noted that the different implementations can use different terminology for identifying ESD protection devices in the netlists, and that the EDA tool can be accordingly adapted to identify such ESD devices based on the terminology used in those implementations.

The EDA tool can proceed select non-ESD devices for inclusion in a reduced netlist for ESD simulation (208). The EDA tool can select a subset of non-ESD devices, from all the non-ESD devices in the netlist of the circuit design 100. The selection of the non-ESD devices for inclusion in the set of non-ESD devices can be based on a determination that a non-ESD device satisfies one of two conditions. The first condition is that at least one terminal of a non-ESD device has a least resistance path (LRP) value from at least one port of the set of ports that is less than a first threshold value. The second condition is that at an effective resistance value between at least one terminal of a non-ESD device from any one of the ports in the set of ports is less than a second threshold value. If any one of these two conditions is met, the EDA tool can include the non-ESD device in the set of non-ESD devices.

The least resistance path can refer to a resistance value for a path of least resistance between two points in the circuit. For example, the EDA tool can determine the resistance of each net in the netlist based on the netlist file and the parasitic information (e.g., in the DSPF file). The EDA tool can then transform the netlist into a graph, where each node of the graph represents a node in the circuit, and each net between two nodes represents a resistance between the two nodes. The EDA tool can then determine a path between a terminal of a non-ESD device and a port in the set of ports. In some instances, the EDA tool can execute an algorithm, such as Djikstra's shortest path algorithm, to determine the path of least resistance between the terminal and the port. The LRP value of the path can be the sum of the resistances of all the nets in the path between the terminal and the port. The LRP value determined for the pair of terminal and port can be compared to the first threshold value. If the LRP value is less than the first threshold value, the EDA tool can include the non-ESD device in the set of non-ESD devices.

The effective resistance can refer to an impedance between the two points on a circuit. For example, the EDA tool can select one terminal of a non-ESD device and a port from the set of ports as two points on the circuit. The EDA tool, as discussed above, can generate a graph that includes the two points as nodes in the graph, and several nets and nodes that can connect the terminal to the port. There can be one or more paths in the graph that can connect the terminal to the port. Each net in each of the paths can have an associated resistance value. The various paths between the terminal and the port can be viewed as a network of series, parallel, or series-parallel resistance networks between the terminal and the node. The EDA tool can then apply Kirchhoff's current and voltage laws to determine the effective resistance between the terminal and the port. In some examples, the EDA tool can determine the effective resistance value based on the methodology discussed in U.S. Pat. No. 9,619,604, entitled "Electrical Analysis Process," which is incorporated by reference herein in its entirety. The EDA tool can then compare the effective resistance value to the second threshold value. If the effective resistance is less than the second threshold value, the EDA tool can include the non-ESD device corresponding to the terminal to the set of non-ESD devices.

The EDA tool can determine the LRP value and the effective resistance value for each terminal of a non-ESD device with respect to each port in the set of ports. Even if one terminal of an non-ESD device satisfies the above mentioned two conditions with even one port of the set of ports, the EDA tool can include the non-ESD device in the set of non-ESD devices. In one example approach, the EDA tool can select one port from the set of ports and determine all the terminals that have resistance paths to that port. The EDA tool can then determine the LRP value and the effective resistance value for each of the terminals with respect to that port. The non-ESD devices whose terminal's LRP values or effective resistance values with respect to that port satisfy the above mentioned two conditions can be included in the set of non-ESD devices. The EDA tool can repeat this approach for each port in the set of ports. When all the ports have been considered, the set of non-ESD devices will include those non-ESD devices for which at least one terminal satisfies the above mentioned two conditions with respect to at least one port of the set of ports.

Figure 3:
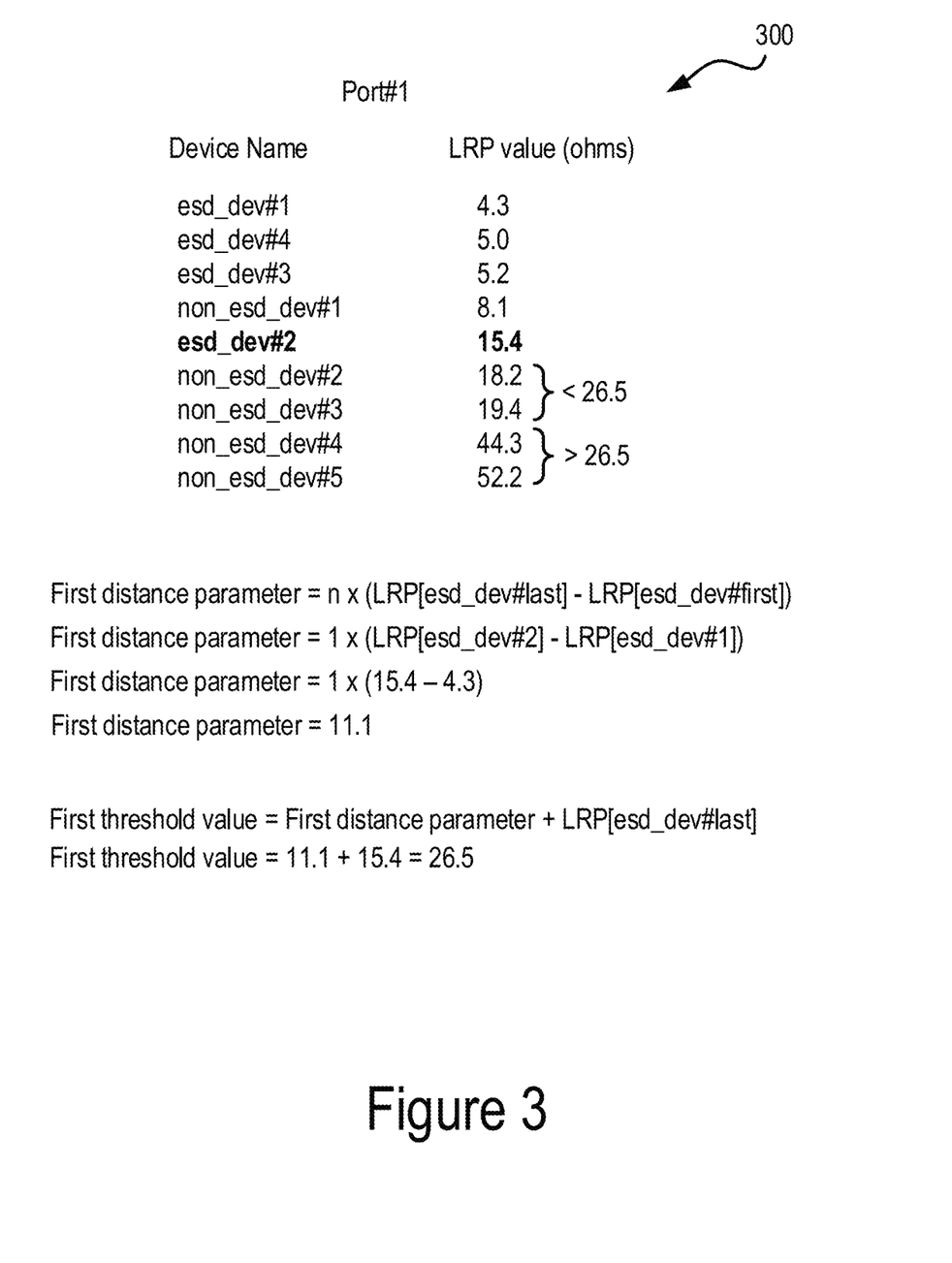
FIG. 3 shows an example approach for determining the non-ESD devices to include in the set of non-ESD devices based on least resistance path values, according to the present embodiments.
Figure 4:
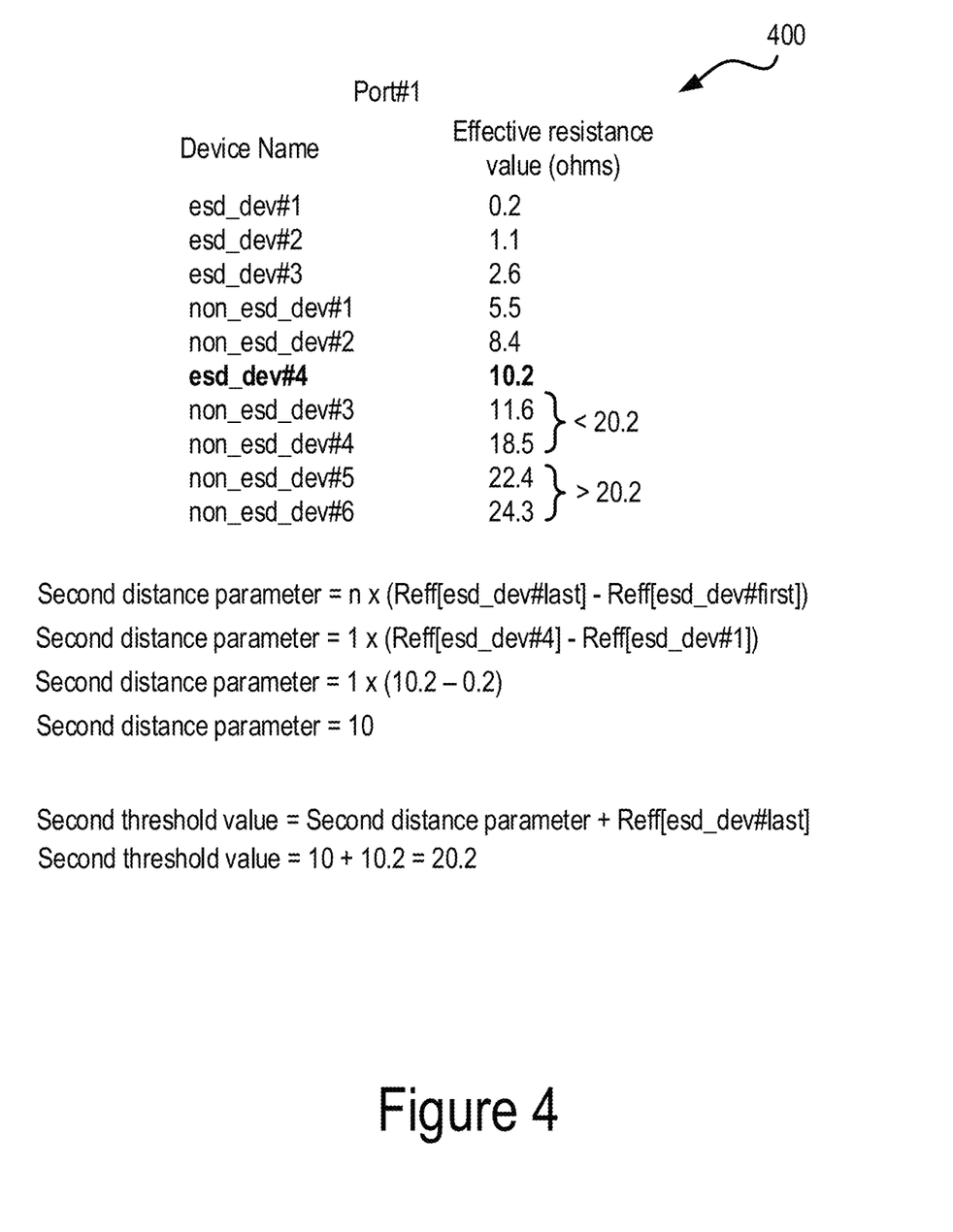
FIG. 4 shows an example approach for determining the non-ESD devices to include in the set of non-ESD devices based on effective resistance values, according to the present embodiments.

The first and second threshold values can be determined based on LRP and effective resistance values associated with the ports and the ESD devices. In one approach, the EDA tool can determine the LRP values and the effective resistance values of each terminal of each ESD device in the circuit design 100 with respect to each port. The EDA tool, for each port, can then set the first threshold value to be greater than the greatest LRP value associated with a terminal of an ESD device with respect to that port, and set the second threshold value to be greater than the greatest effective resistance value associated with a terminal of an ESD device with respect to that port. FIGS. 3 and 4 below provide additional example approaches for selecting the first and the second threshold values.

Once the EDA tool determines the set of non-ESD devices, the EDA tool can generate a reduced netlist from the original netlist of the circuit design (210). In particular, the EDA tool can include in the reduced netlist all the ESD devices and the set of non-ESD devices determined above. In addition, the reduced netlist can include all the paths that exist in the original netlist between each terminal of the ESD device and each of the ports in the set of ports. For example, referring to FIG. 1, the reduced netlist can include all of the ESD devices, such as the primary ESD circuitry 110, the secondary ESD circuitry 112, and the power clamp circuitry 114. In addition, the reduced netlist can also include the paths existing in the original netlist between each terminal of the primary ESD circuitry 110, the secondary ESD circuitry 112, and the power clamp circuitry 114 and each of the I/O pad 104, the VDD pad 106, and the VSS pad 108. With respect to the non-ESD devices, the reduced netlist includes all of the non-ESD devices. Further, the reduced netlist includes the least resistance paths between each terminal of the selected non-ESD device and any of the ports in the set of ports. For example, referring to FIG. 1, if the interface circuitry 116 is selected by the EDA tool to be in the set of non-ESD devices, the EDA tool will include the interface circuitry 116 in the reduced netlist. In addition, the EDA tool will include the least resistive path between the interface circuitry 116 and the ports in the set of ports.

The EDA tool can further include the capacitances associated with each net or node included in the reduced netlist. The EDA tool can again utilize the parasitic information included in the DSPF file to determine the capacitances associated with each net or node in the reduced netlist and include the capacitance information in the reduced netlist.

The EDA tool can utilize the reduced netlist for ESD analysis (212). The reduced netlist includes only a subset of all the non-ESD devices in the circuit design. As a result, the number of nodes that need to be analyzed for ESD analysis is smaller than the number of nodes in the original netlist that includes all of the non-ESD devices in the circuit design. Generally, the time required to run a simulation is a function, in part, of the number of nodes or devices in the circuit design to be simulated. Thus, the simulation of the reduced netlist for ESD analysis would take less time than that of the original netlist of the circuit design. In some example implementations, the EDA tool can utilize tools such as Voltus™-Fi by Cadence® to run the ESD simulation on the reduced netlist, however, the above mentioned tool is only an example, and other tools such as for example PathFinder™ by ANSYS® can also be utilized.

FIG. 3 shows an example approach for determining the non-ESD devices to include in the set of non-ESD devices based on least resistance path values. The EDA tool can determine the LRP values of the terminals of all the ESD devices and the terminals of all the non-ESD devices with respect to Port #1. Port #1 can be the ports included in the set of ports determined in step 204 of the process 200 shown in FIG. 2. As an example, Port #1 can be the I/O pad 104 shown in FIG. 1. The EDA tool then generates a first sorted list of devices 300 associated with the Port #1 with ascending values of least resistance path values. For example, the first sorted list of devices 300 includes esd_dev #1, esd_dev #4, esd_dev #3, and so on in an ascending order of their respective least resistance path values with respect to the Port #1.

The EDA tool can then determine the ESD device in the list that has the greatest least resistance path value. For example, the EDA tool can determine that the device "esd_dev #2" has the greatest least resistance path value of 15.4 among all the ESD devices in the list 300. The EDA tool can then determine the least resistance value of the first ESD device in the list 300. For example, the EDA tool can determine that the device "esd_dev #1" is the first ESD device in the list 300 having a least resistance path value of 4.3. The EDA tool can use the least resistance values of the first and the last ESD devices in the list to determine a first distance parameter. For example, the EDA tool can determine the first distance parameter to be equal to 15.5−4.3=11.1. In some examples, the EDA tool can determine the value of the first distance parameter by multiplying the difference between the least resistance path values of the first and the last ESD device with a multiplier 'n'. The value of 'n' can be greater or equal to 1 (one). In the example shown in FIG. 3, the EDA tool can select the value of the multiplier to be equal to one, resulting the in value of the first distance parameter to be equal to 11.1.

The EDA tool can then determine the value of the first threshold value based on a sum of the least resistance path value associated with the last ESD device and the first distance parameter. For example, referring to FIG. 3, the EDA tool can determine the first threshold value to be equal to the sum of 15.5 and 11.1 (which is equal to 26.6). The EDA tool can then compare the least resistance path values associated with the non-ESD devices with the first threshold value. If the EDA tool determines that the least resistance path value of a non-ESD device is less than the first threshold value, the EDA tool can include that non-ESD device in the set of non-ESD devices. For example, referring to FIG. 3, the EDA tool can determine that the least resistance path values associated with device names "non_esd_dev #2" and "non_esd_dev #3" is less than the first threshold value of 26.5. Therefore, the EDA tool can select these two devices to be included in the set of non-ESD devices. However, the least resistance path values associated with the devices named "non_esd_dev #4" and "non_esd_dev #5" are greater than the first threshold value of 26.5, and therefore, the EDA tool would not include these two devices in the set of non-ESD devices.

In some examples, the EDA tool may determine the first threshold value based on a sum of the least resistance value of the last ESD device (e.g., "esd_dev #2) in the list 300 (i.e., the ESD device with the greatest least resistance path value) and an offset value. The offset value can have a lower limit as zero and an upper limit as a function of the least resistance value of the last ESD device in the list 300. For example, the offset value can be zero. In such instances, the first threshold value is equal to the least resistance path value of the last ESD device. In some other examples, the offset value can be equal to the least resistance path value of the last ESD device (e.g., 15.4). In such instances, the first threshold value would be equal to 30.8. The offset value, and the multiplier (discussed above) can be selected to control the number of non-ESD devices included in the reduced netlist. For example, the number of non-ESD devices included may increase with an increase in the value of the multiplier or the value of the offset, as the increase would result in a corresponding increase in the first threshold value, which, in turn, would result in more non-ESD devices in the list 300 to be included in the reduced netlist.

The EDA tool can follow the approach discussed above to determine non-ESD devices to be included in the set of non-ESD devices based on effective resistance values. FIG. 4 shows an example approach for determining the non-ESD devices to include in the set of non-ESD devices based on effective resistance values. The EDA tool can generate for a port in the set of ports (e.g., Port #1) a second sorted list of devices 400 that includes ESD devices and non-ESD devices with ascending effective resistance (Reff) values. The EDA tool can determine the Reff values of the terminals of all the ESD devices and the terminals of all the non-ESD devices with respect to Por #1. The EDA tool can then generate the second sorted list of devices 400 with ascending values of the Reff values. The devices listed in the second sorted list of devices 400 can have one or more devices listed in the first sorted list of devices 300 shown in FIG. 3. However, because the second sorted list 400 lists the devices based on effective resistance values and not based on least resistance path values, the order of the devices may be different.

The EDA tool can then determine the ESD device that has the greatest Reff value in the second sorted list of devices 400. For example, the EDA tool can determine that the device "esd_dev #4" has the greatest Reff value among all ESD devices in the list 400. The EDA tool can then determine the Reff value of the first ESD device in the list 400. For example, the EDA tool can determine the device "esd_dev #1" is the first ESD device in the list 400 having the least Reff value of 0.2. The EDA tool can then use the Reff value of the first and the last ESD devices in the list 400 to determine a second distance parameter. For example, the EDA tool can determine the second distance parameter to be equal to 10.2−0.2=10. Similar to that discussed above in relation to the first distance parameter, the EDA tool can utilize a multiplier 'n' to determine the second distance parameter. The value of the multiplier utilized to determine the first distance parameter can be different from the value of the multiplier used to determine the second distance parameter. In the example shown in FIG. 4, the EDA tool utilizes a multiplier with a value equal to one.

The EDA tool can then determine the value of the second threshold value based on a sum of the Reff value associated with the last ESD device in the list 400 and the second distance parameter. For example, referring to FIG. 4, the EDA tool can determine the second threshold value to be equal to the sum of 10 and 10.2 (which is equal to 20.2). The EDA tool can then compare the Reff values associated with the non-ESD devices with the second threshold value. If the EDA tool determines that the Reff value of a non-ESD device is less than the second threshold value, the EDA tool can include that non-ESD device in the set of non-ESD devices. For example, referring to FIG. 4, the EDA tool can determine that the Reff values associated with the devices names "non_esd_dev #3" and "non_esd_dev #4" is less than the second threshold value of 20.2. The EDA tool will therefore include the devices "non_esd_dev #3" and "non_esd_dev #4" in the set of non-ESD devices. It should be noted that the device "non_esd_dev #4" was not selected in the first sorted list of devices shown in FIG. 3. However, the device can be selected if it satisfies any one of the conditions (i) having a least resistance path value that is less than the first threshold value, or having an effective resistance value that is less than the second threshold value. Thus, the EDA tool includes the device "non_esd_dev #4" in the set of non-ESD devices. The devices "non_esd_dev #5" and "non_esd_dev #6" have Reff values that are greater than the second threshold value, and are therefore not included in the set of non-ESD devices.

Similar to that discussed above in relation to the first threshold value, the EDA tool can determine the second threshold value based on the Reff value of the last ESD device in the second sorted list of devices 400 and an offset value. The offset value can have a lower limit as zero and an upper limit as a function of the Reff of the last ESD device in the list 400. The offset value and the value of the multiplier can be selected to control the number of non-ESD devices that are included in the reduced netlist.

The EDA tool can carry out the above discussed approach for each port in the set of ports. That is, the EDA tool can repeat the above approach for each port in the set of ports to determine the non-ESD devices to be included in the set of non-ESD devices. In some instances the EDA tool may determine that a non-ESD device in a sorted list corresponding to a particular port is already present in the set of non-ESD devices. In such instances, the EDA tool can proceed with including other qualifying non-ESD devices. A complete set of non-ESD devices may be obtained after the EDA tool has carried out the above approach for all the ports in the set of ports. After all the ports in the set of ports have been considered, the EDA tool, as discussed above in relation to FIG. 2, can include the non-ESD devices in the reduced netlist.

Figure 5:
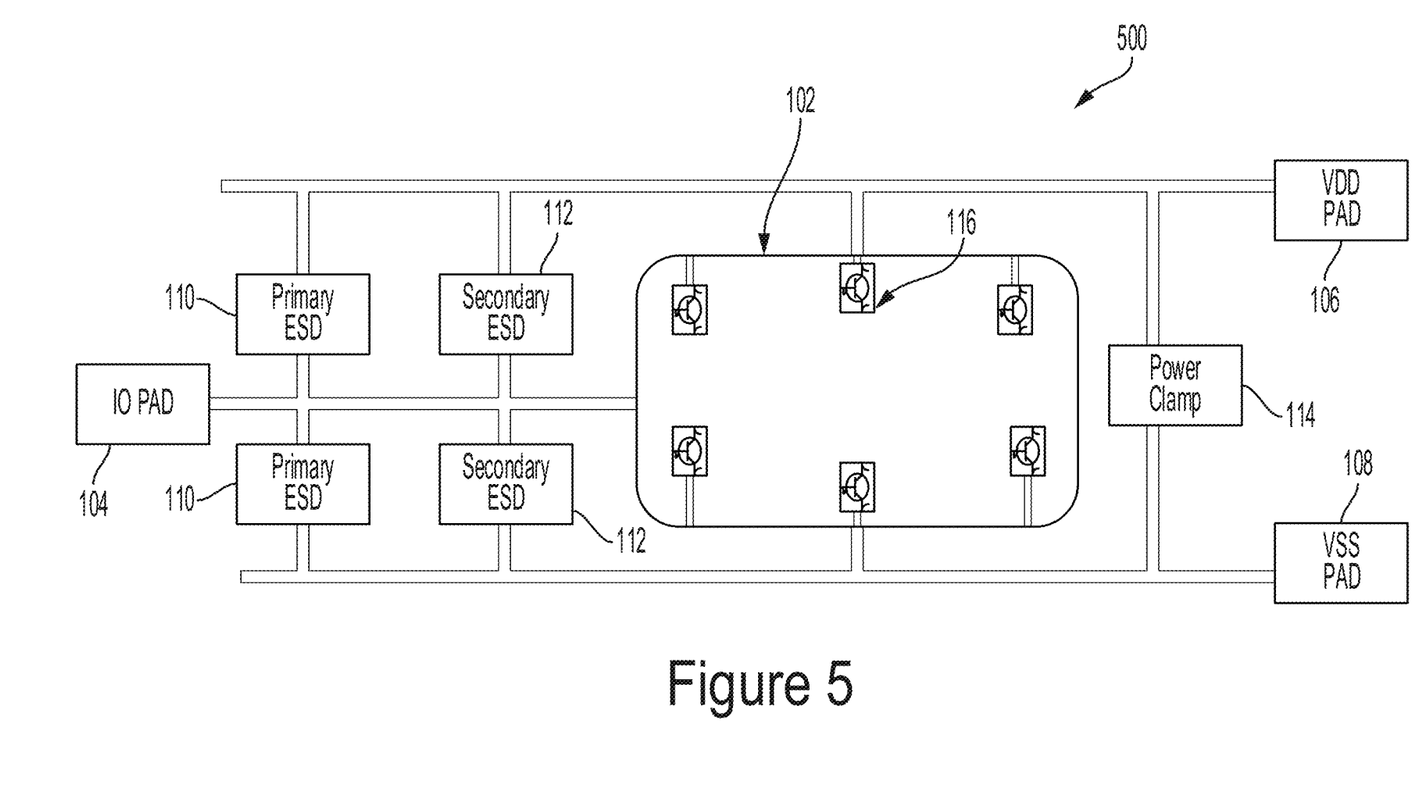
FIG. 5 shows an example reduced circuit design for ESD simulation, according to the present embodiments.

FIG. 5 shows an example reduced circuit design 500 for ESD simulation. In particular, FIG. 5 shows a schematic diagram representing a reduced netlist determined using the process 200 discussed above. The reduced circuit design 500 includes all of the ESD devices: the primary ESD circuitry 110, the secondary ESD circuitry 112, and the power clamp circuitry 114. The reduced circuit design 500 also includes the ports: the I/O pad 104, the VDD pad 106, and the VSS pad 108. In addition, the reduced circuit design 500 includes non-ESD devices such as the interface circuitry 116. However, the reduced circuit design 500 does not include a large portion of the internal circuitry 102. The non-ESD devices within the internal circuitry were eliminated by the EDA tool based on the selection criteria discussed above. That is, the EDA tool did not select most of the internal circuitry 102 in the set of non-ESD devices. As a result, the non-ESD devices not selected to be in the set of non-ESD devices are not present in the reduced circuit design 500. As the number of devices in the reduced netlist are less than those in the original netlist (a representation of which is shown in FIG. 1), the simulation of the reduced circuit design 500 shown in FIG. 5 can be completed in a fraction of the time required to simulate the original netlist.

Figure 6:
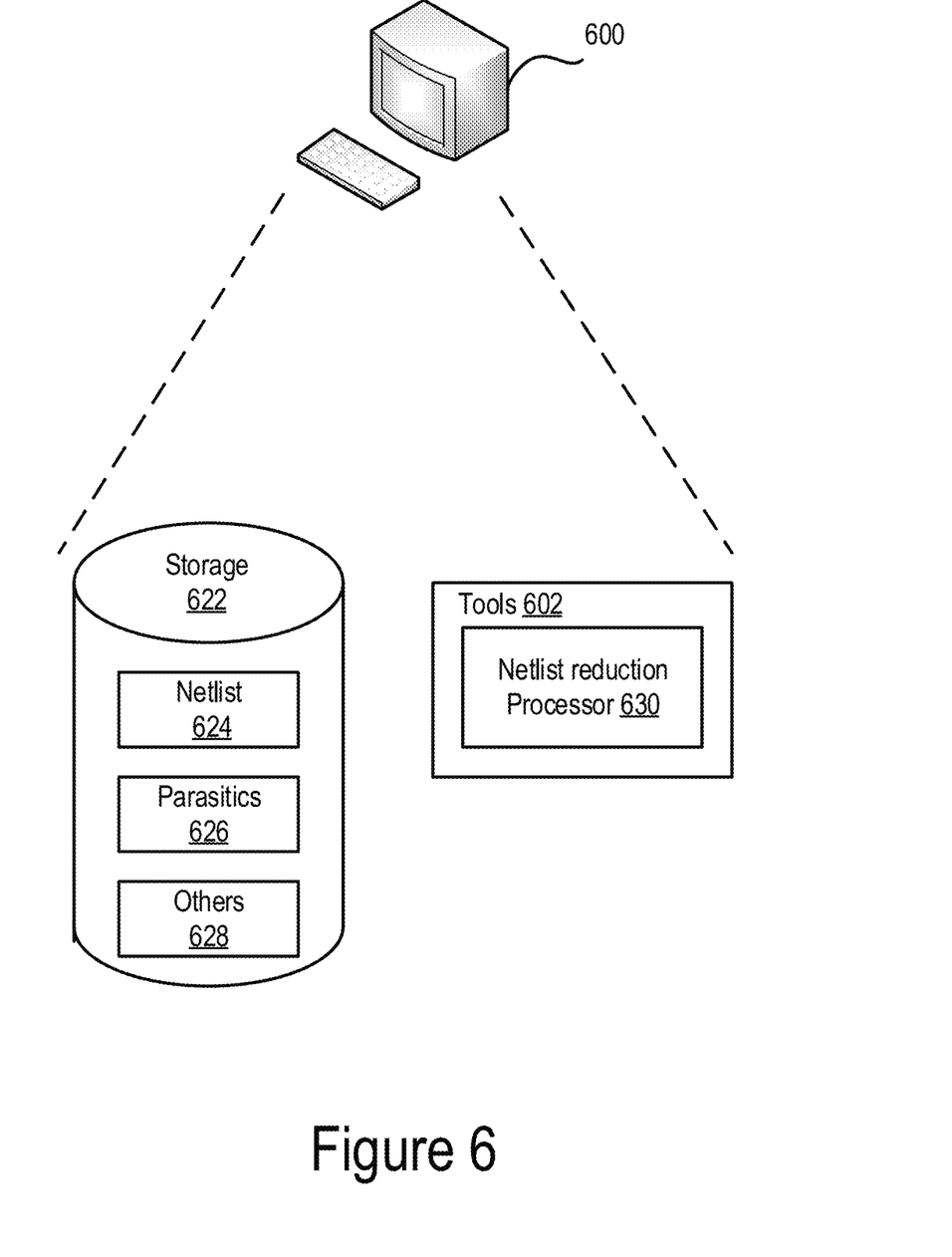
FIG. 6 is a functional block diagram of an example computing system 600 for determining a reduced netlist for ESD analysis of integrated circuits, according to the present embodiments.

FIG. 6 is a functional block diagram of an example computing system 600 for determining a reduced netlist for ESD analysis of integrated circuits according to the present embodiments. In some embodiments, the system 600 can be one or more computers that are loaded with software (e.g., EDA tools) and/or customized to include hardware for interactively and/or automatically implementing designs of integrated circuits (e.g., ASICs, SOCs, full custom digital ICs). In some embodiments, the one or more computing systems 600 comprise various components not shown such as processor(s) or processor core(s), memory, disks, etc. The software and/or custom hardware may include interactive or automated modules such as a placer, a routing engine, a layout editor, a wire editor, a design rule checker, a verification engine, a module generator, and/or a floor-planner, as will be appreciated by those skilled in the art.

In one or more embodiments, the computing system 600 may further write to and read from a local or remote volatile or non-volatile computer accessible storage 622 that stores thereon data or information such as, but not limited to, one or more databases such as post-placement layouts, schematic design database(s) or physical design database(s) (e.g., GDS II or OASIS data, etc.), circuit stage credit database 624, libraries, rule decks, constraints (e.g., timing constraints such as required arrival time, etc.), etc. 626, and/or other information or data 628 (e.g., netlists, derates, parasitic data, SDF, etc.) that may be required to support the methodology of the present embodiments. According to certain aspects, the databases and libraries in the storage 622 are extendable or changeable (e.g., via APIs and the like) without changing other components or data in system 600.

In some embodiments, the one or more computing systems are implemented in a "cloud" configuration and/or a client/server configuration. For example, one or more server computers may be loaded with application software (e.g., a router and/or other EDA tool) for implementing some or all of the methodology of the present embodiments, and one or more client computers can communicate with the server computer(s) via a network to perform some or all of the methodology of the embodiments for a particular design.

In some embodiments, the one or more computing systems 600 may, by various standalone software, hardware modules or combinations thereof 602 (e.g., EDA tool), include a netlist reduction processor 630 that executes the processes and approaches discussed above to reduce the original netlist of a circuit design for more efficient ESD analysis. The netlist reduction processor 630 can execute the processes 200 and the approaches discussed above in relation to FIGS. 3-5. The netlist reduction processor 630 may be implemented by adapting or communicating with certain pre-existing modules (e.g., design workflow, design timing, design optimization, design sign-off, etc.) as may be required to implement a methodology to implement netlist processing and determining least resistance paths and effective resistances to the present embodiments and as described above. Those skilled in the art will be able to understand how to implement various examples of such modules after being taught by the present disclosure.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method for processing circuitry for electro-static discharge (ESD) analysis, comprising:
   receiving, by at least one processor, a netlist of a circuit;
   determining, by the at least one processor, a set of ports of the circuit, the set of ports including at least one of a voltage source port, a voltage sink port, or an input-output port;
   determining, by the at least one processor, ESD devices in the circuit;
   determining, by the at least one processor, non-ESD devices in the circuit;
   selecting, by the at least one processor, a set of non-ESD devices from the non-ESD devices in the circuit, wherein for each non-ESD device in the set of non-ESD devices at least one of (i) a least resistance path (LRP) value of at least one terminal of the non-ESD device from any port of the set of ports is less than a first threshold value or (ii) an effective resistance value between at least one terminal of the non-ESD device from any port of the set of ports is less than a second threshold value is true;
   generating, by the at least one processor, a reduced netlist of the circuit from the netlist of the circuit, the reduced netlist including the set of ESD devices and the set of non-ESD devices;
   simulating, by the at least one processor, the reduced netlist for ESD analysis.

2. The method of claim 1, further comprising:
   for each port from the set of ports:
      generating, by the at least one processor, a first sorted list of devices, the first sorted list of devices including ESD devices and non-ESD devices with ascending respective LRP values in relation to the port,
      determining, by the at least one processor, a first ESD device and a last ESD device in the first sorted list of devices,
      determining, by the at least one processor, a first distance parameter based on a difference between LRP values associated with the first ESD device and the last ESD device in the first sorted list of devices,
      determining, by the at least one processor, the first threshold value based on a sum of the first distance parameter and the LRP value associated with the last ESD device, and
      selecting, by the at least one processor, each non-ESD device in the first sorted list of devices that has a respective LRP value that is less than the first threshold value to be included in the set of non-ESD devices.

3. The method of claim 2, wherein the first distance parameter is determined by multiplying the difference between LRP values associated with the first ESD device and the last ESD device in the first sorted list of devices with a multiplier, wherein the multiplier has a value that is greater than or equal to 1.

4. The method of claim 1, further comprising:
   for each port from the set of ports:
      generating, by the at least one processor, a second sorted list of devices, the second sorted list of devices including ESD devices and non-ESD devices with ascending respective effective resistance values in relation to the port,
      determining, by the at least one processor, a first ESD device and a last ESD device in the second sorted list of devices,
      determining, by the at least one processor, a second distance parameter based on a difference between effective resistance values associated with the first ESD device and the last ESD device in the second sorted list of devices,
      determining, by the at least one processor, the second threshold value based on a sum of the second distance parameter and the effective resistance value associated with the last ESD device, and
      selecting, by the at least one processor, each non-ESD device in the second sorted list of devices that has a respective effective resistance value that is less than the second threshold value to be included in the set of non-ESD devices.

5. The method of claim 4, wherein the second distance parameter is determined by multiplying the difference between effective distance values associated with the first ESD device and the last ESD device in the second sorted list of devices with a multiplier, wherein the multiplier has a value that is greater than or equal to 1.

6. The method of claim 1, wherein the LRP value is determined based on Dijkstra's shortest-path algorithm.

7. The method of claim 1, wherein the effective resistance value is determined based on a matrix-solver algorithm.

8. The method of claim 1, wherein the reduced netlist includes all resistive paths to the ESD devices, and resistive paths to the set of non-ESD devices.

9. A non-transitory computer readable storage medium having instructions stored thereon which when executed by one or more processors, cause the one or more processors to:
receive a netlist of a circuit;
determine a set of ports of the circuit, the set of ports including at least one of a voltage source port, a voltage sink port, or an input-output port;
determine ESD devices in the circuit;
determine non-ESD devices in the circuit;
select a set of non-ESD devices from the non-ESD devices in the circuit, wherein for each non-ESD device in the set of non-ESD devices at least one of (i) a least resistance path (LRP) value of at least one terminal of the non-ESD device from any port of the set of ports is less than a first threshold value or (ii) an effective resistance value between at least one terminal of the non-ESD device from any port of the set of ports is less than a second threshold value is true;
generate a reduced netlist of the circuit from the netlist of the circuit, the reduced netlist including the set of ESD devices and the set of non-ESD devices;
simulate the reduced netlist for ESD analysis.

10. The non-transitory computer readable storage medium of claim 9, wherein the instructions when executed cause the one or more processor to:
for each port from the set of ports:
generate a first sorted list of devices, the first sorted list of devices including ESD devices and non-ESD devices with ascending respective LRP values in relation to the port,
determine a first ESD device and a last ESD device in the first sorted list of devices,
determine, by the at least one processor, a first distance parameter based on a difference between LRP values associated with the first ESD device and the last ESD device in the first sorted list of devices,
determine the first threshold value based on a sum of the first distance parameter and the LRP value associated with the last ESD device, and
select each non-ESD device in the first sorted list of devices that has a respective LRP value that is less than the first threshold value to be included in the set of non-ESD devices.

11. The non-transitory computer readable storage medium of claim 10, wherein the first distance parameter is determined by multiplying the difference between LRP values associated with the first ESD device and the last ESD device in the first sorted list of devices with a multiplier, wherein the multiplier has a value that is greater than or equal to 1.

12. The non-transitory computer readable storage medium of claim 9, wherein the instructions when executed cause the one or more processor to:
for each port from the set of ports:
generate a second sorted list of devices, the second sorted list of devices including ESD devices and non-ESD devices with ascending respective effective resistance values in relation to the port,
determine a first ESD device and a last ESD device in the second sorted list of devices,
determine a second distance parameter based on a difference between effective resistance values associated with the first ESD device and the last ESD device in the second sorted list of devices,
determine the second threshold value based on a sum of the second distance parameter and the effective resistance value associated with the last ESD device, and
select each non-ESD device in the second sorted list of devices that has a respective effective resistance value that is less than the second threshold value to be included in the set of non-ESD devices.

13. The non-transitory computer readable storage medium of claim 12, wherein the second distance parameter is determined by multiplying the difference between effective distance values associated with the first ESD device and the last ESD device in the second sorted list of devices with a multiplier, wherein the multiplier has a value that is greater than or equal to 1.

14. The non-transitory computer readable storage medium of claim 9, wherein the LRP value is determined based on Dijkstra's shortest-path algorithm.

15. The non-transitory computer readable storage medium of claim 9, wherein the effective resistance value is determined based on a matrix-solver algorithm.

16. The non-transitory computer readable storage medium of claim 9, wherein the reduced netlist includes all resistive paths to the ESD devices, and resistive paths to the set of non-ESD devices.

17. A system comprising:
one or more processors, the one or more processors configured to:
receive a netlist of a circuit;
determine a set of ports of the circuit, the set of ports including at least one of a voltage source port, a voltage sink port, or an input-output port;
determine ESD devices in the circuit;
determine non-ESD devices in the circuit;
select a set of non-ESD devices from the non-ESD devices in the circuit, wherein for each non-ESD device in the set of non-ESD devices at least one of (i) a least resistance path (LRP) value of at least one terminal of the non-ESD device from any port of the set of ports is less than a first threshold value or (ii) an effective resistance value between at least one terminal of the non-ESD device from any port of the set of ports is less than a second threshold value is true;
generate a reduced netlist of the circuit from the netlist of the circuit, the reduced netlist including the set of ESD devices and the set of non-ESD devices;
simulate the reduced netlist for ESD analysis.

18. The system of claim 17, wherein the one or more processors are configured to:
for each port from the set of ports:
generate a first sorted list of devices, the first sorted list of devices including ESD devices and non-ESD devices with ascending respective LRP values in relation to the port, determine a first ESD device and a last ESD device in the first sorted list of devices, determine, by the at least one processor, a first distance parameter based on a difference between LRP values associated with the first ESD device and the last ESD device in the first sorted list of devices, determine the first threshold value based on a sum of the first distance parameter and the LRP value associated with the last ESD device, and select each non-ESD device in the first sorted list of devices that has a respective LRP value that is less than the first threshold value to be included in the set of non-ESD devices.

19. The system of claim 18, wherein the first distance parameter is determined by multiplying the difference between LRP values associated with the first ESD device and the last ESD device in the first sorted list of devices with a multiplier, wherein the multiplier has a value that is greater than or equal to 1.

20. The system of claim 17, wherein the one or more processors are configured to:

for each port from the set of ports:

generate a second sorted list of devices, the second sorted list of devices including ESD devices and non-ESD devices with ascending respective effective resistance values in relation to the port, determine a first ESD device and a last ESD device in the second sorted list of devices, determine a second distance parameter based on a difference between effective resistance values associated with the first ESD device and the last ESD device in the second sorted list of devices, determine the second threshold value based on a sum of the second distance parameter and the effective resistance value associated with the last ESD device, and select each non-ESD device in the second sorted list of devices that has a respective effective resistance value that is less than the second threshold value to be included in the set of non-ESD devices.

* * * * *